US 6,539,773 B2

(12) United States Patent
Clauer et al.

(10) Patent No.: US 6,539,773 B2
(45) Date of Patent: *Apr. 1, 2003

(54) SHOCK PRESSURE GAUGE FOR LASER PEENING APPARATUS

(75) Inventors: Allan H. Clauer, Worthington, OH (US); Craig T. Walters, Powell, OH (US); David F. Lahrman, Powell, OH (US)

(73) Assignee: LSP Technologies, Inc., Dublin, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/883,712

(22) Filed: Jun. 18, 2001

(65) Prior Publication Data

US 2001/0042397 A1 Nov. 22, 2001

Related U.S. Application Data

(62) Division of application No. 09/443,811, filed on Nov. 19, 1999.

(51) Int. Cl.[7] .................................................. G01L 5/00
(52) U.S. Cl. ...................................... 73/11.02; 73/12.09
(58) Field of Search ........................... 73/11.01, 11.02, 73/12.01, 12.04, 12.08, 12.09, 12, 26.1

(56) References Cited

U.S. PATENT DOCUMENTS

| 4,850,229 | A |   | 7/1989  | Phillips              |
|-----------|---|---|---------|-----------------------|
| 5,492,447 | A |   | 2/1996  | Mannava et al.        |
| 5,671,628 | A |   | 9/1997  | Halila et al.         |
| 5,691,479 | A |   | 11/1997 | Krisch et al.         |
| 5,951,790 | A | * | 9/1999  | Mannava et al. ........... 148/510 |
| 6,089,106 | A |   | 7/2000  | Patel et al.          |
| 6,144,012 | A |   | 11/2000 | Dulaney et al.        |
| 6,183,882 | B1 | * | 2/2001 | Mannava et al. ........... 148/510 |
| 6,254,703 | B1 | * | 7/2001 | Sokol et al. ................. 148/508 |

* cited by examiner

*Primary Examiner*—Max Noori
(74) *Attorney, Agent, or Firm*—Randall J. Knuth

(57) ABSTRACT

An apparatus for measuring the strength of a pressure pulse created from a laser peening device. The apparatus is reusable, and includes a pressure-sensitive medium, a back-up disk, and a cap, all disposed within a housing having a removable lid. All components of the apparatus are replaceable, thereby allowing an operator to utilize the apparatus more than once despite the harsh environment of laser peening.

29 Claims, 2 Drawing Sheets

SHOCK PRESSURE GAUGE FOR LASER PEENING APPARATUS

This is a divisional of patent application Ser. No. 09/443,811 filed on Nov. 19, 1999, the disclosure of which is herein explicitly incorporated by reference.

This invention was made with United States Government support under Contract No. F33615-98-C-5150 awarded by the Department of the Air Force. The United States Government has certain rights to this invention.

BACKGROUND OF THE INVENTION

1. Field of the Invention

The present invention relates to the use of coherent energy pulses, as from high powered pulse lasers, in the shock processing of solid material, and, more particularly, to a reusable gauge for measuring the strength of an energy pulse in a laser peening apparatus.

2. Description of the Related Art

Laser shock peening is a process for improving the fatigue, hardness, and corrosion resistance properties of materials by focusing radiation on preselected surface areas of a workpiece. Shock peening the workpiece can avoid gross deformation, cracking, and spallation of the workpiece, and nonplanar workpieces can be shock processed without the need of elaborate and costly shock focusing schemes.

Laser peening, or also referred to as laser shock processing, utilizes two overlays: a transparent overlay (usually water) and an opaque overlay, typically an oil based, acrylic based, or water based, black paint. During processing, a laser beam is directed to pass through the water overlay and is absorbed by the black paint, causing a rapid plasma formation and vaporization of the paint surface and the generation of a high amplitude shock wave. The shock wave cold works the surface of the workpiece and creates compressive residual stresses, which provide an increase in fatigue properties of the part. A workpiece may be processed by producing a matrix of overlapping spots that cover the fatigue critical zone of the part.

It would be advantageous for maintaining control and consistency in the laser peening process to utilize a pressure gauge that would sense the pressure being applied by the laser to the workpiece. Because of the high pressure associated with the laser peening process, however, gauges currently utilized in laser peening devices are typically single use gauges, and therefore, render a relatively expensive means of determining the strength of the created shock wave.

SUMMARY OF THE INVENTION

The present invention provides a method of gauging the strength of the laser-formed shock wave with a reusable, and therefore, cost efficient device. The invention comprises replaceable components, including a pressure sensitive medium, a housing for that medium, including a screw-on ring to hold internal components in place, a cap for the pressure-sensitive medium, a back-up disk, a momentum trap, and a spring.

In the invention, a housing is removably mated with a screw-on ring, and the pressure-sensing medium is disposed between the a back-up disk and a cap. The cap includes an external surface and an internal surface, the internal surface having a convex shape for ensuring intimate contact with the back-up disk and the pressure-sensing medium.

It is an advantage of the present invention that components can easily be replaced in the gauge by opening the housing, replacing the necessary components, and assembling it back together. By this process, gauge components that wear at a faster rate than their cooperating components can be exchanged without disposing of the entire gauge.

It is a further advantage of the present invention that the gauge provides a low cost alternative to single use gauges. By providing replaceable gauge components, the invention allows a user to replace only damaged or worn out parts of the gauge, rather than the entire gauge, during the laser peening process.

The invention comprises, in one form thereof, a thick high-strength steel or ceramic back-up disk for backing up a pressure gauge medium, such as manganin. In the ceramic embodiment of the back-up disk, a circumscribing guard ring is provided for protecting the ceramic core.

A separate, thin metal disk or cap engages the back-up disk, thereby holding the pressure gauge medium in intimate contact between the back-up disk and the metal cap.

In the preferred embodiment of the invention, the pressure-gauge-engaging surface of the cap is shaped in a convex manner, so that it holds the pressure gauge medium in close registry with the back-up disk. The preferred embodiment of the invention is further defined to include alignment notches on both the cap and the housing to prevent relative rotation between the cap and the housing to prevent relative rotation between the cap and pressure gauge medium, thereby avoiding damage to the pressure medium. Adequate contact is necessary for accurately reading the strength of the shock wave. Reading of the shock wave magnitude is accomplished by the cap receiving the shock wave and conducting the shock wave to the pressure gauge medium.

The preferred embodiment of the invention further comprises a momentum trap for attenuating and trapping the shock wave, thereby preventing undue damage to the shock pressure gauge system. Without the momentum trap a shock wave could continue to reverberate within the gauge, causing fracture and yielding a shorter life span for gauge components.

Additionally, a spring is provided between the momentum trap and the housing, for holding the gauge components firmly against the back-up disk. Also, after each firing of the laser, the spring returns the components to their original position.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Laser shock processing is an effective method of increasing fatigue life in metals by treating fatigue critical regions. The effects of laser shock processing on fatigue of welded specimens has been studied in great detail in "Shock Waves and High Strained Rate Phenomena in Metals" by A. H. Clauer, J. H. Holbrook and B. P. Fairand, Ed. by M. S. Meyers and L. E. Murr, Plenum Press, New York (1981), PP. 675–702.

For more thorough background in the prior history of laser shock processing and that of high power processing of engineered materials, reference can be made to U.S. Pat. Nos. 5,131,957 and 5,741,559, these patents explicitly hereby incorporated by reference.

Figure 1:
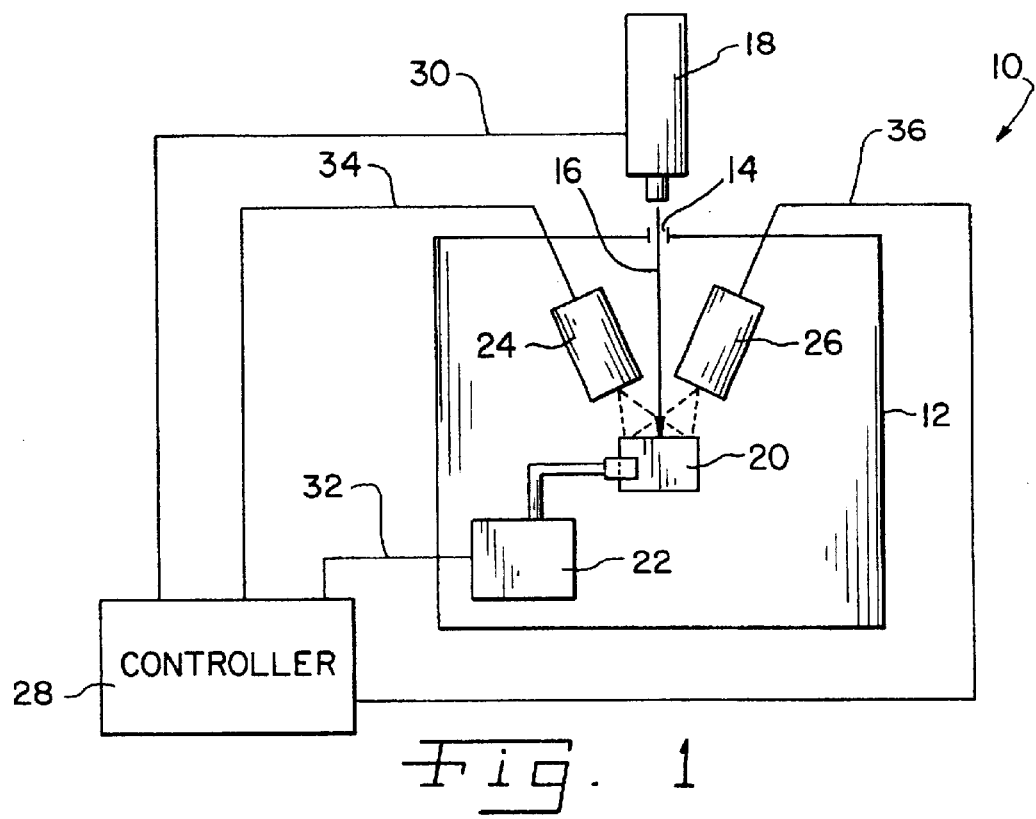
FIG. 1 is a diagrammatic view of one embodiment of a laser shock peening system.

Referring now to FIG. 1, a typical laser shock processing apparatus 10 comprises a target chamber 12 with an opening 14 for a laser beam 16 created by laser 18, a source of coherent energy. Laser 18, by way of example, may be a commercially available high power pulse laser system capable of delivering more than approximately 40 joules in 5 to 100 nanoseconds. The laser pulse length and focus of the laser beam may be adjusted as known in the art. As shown in FIG. 1, a workpiece 20 is held in position within target chamber 12 by means of a positioning mechanism 22.

Apparatus 10 includes a material applicator 24 for applying an energy absorbing material onto workpiece 20 to create a "coated" portion. Material applicator 24 may be that of a solenoid-operated painting station or other construction such as a jet spray or aerosol unit to provide a small coated area on workpiece 20. Apparatus 10 further includes a transparent overlay application 26 that applies a fluid or liquid transparent overlay to workpiece 10 over the portion coated by material applicator 24. Transparent overlay material should be substantially transparent to the radiation, water being the preferred overlay material.

Figure 2:
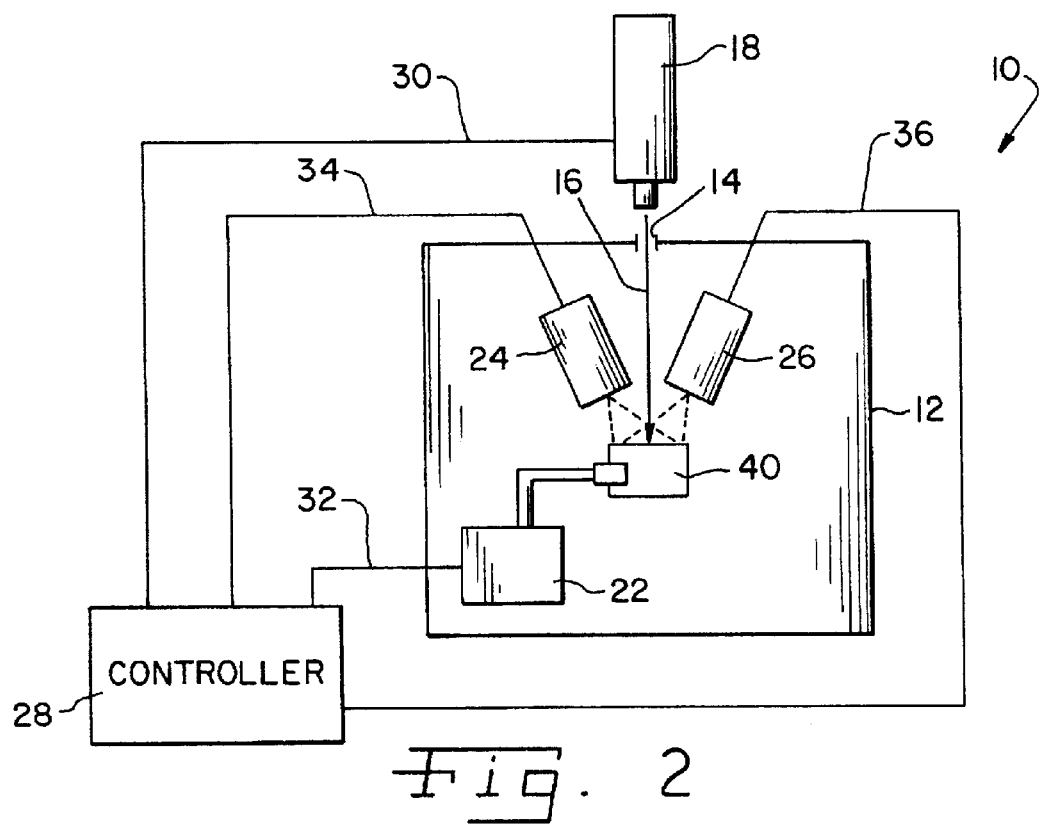
FIG. 2 is a diagrammatic view of the laser shock peening device of FIG. 1, incorporated with a shock pressure gauge of the present invention.
Figure 3:
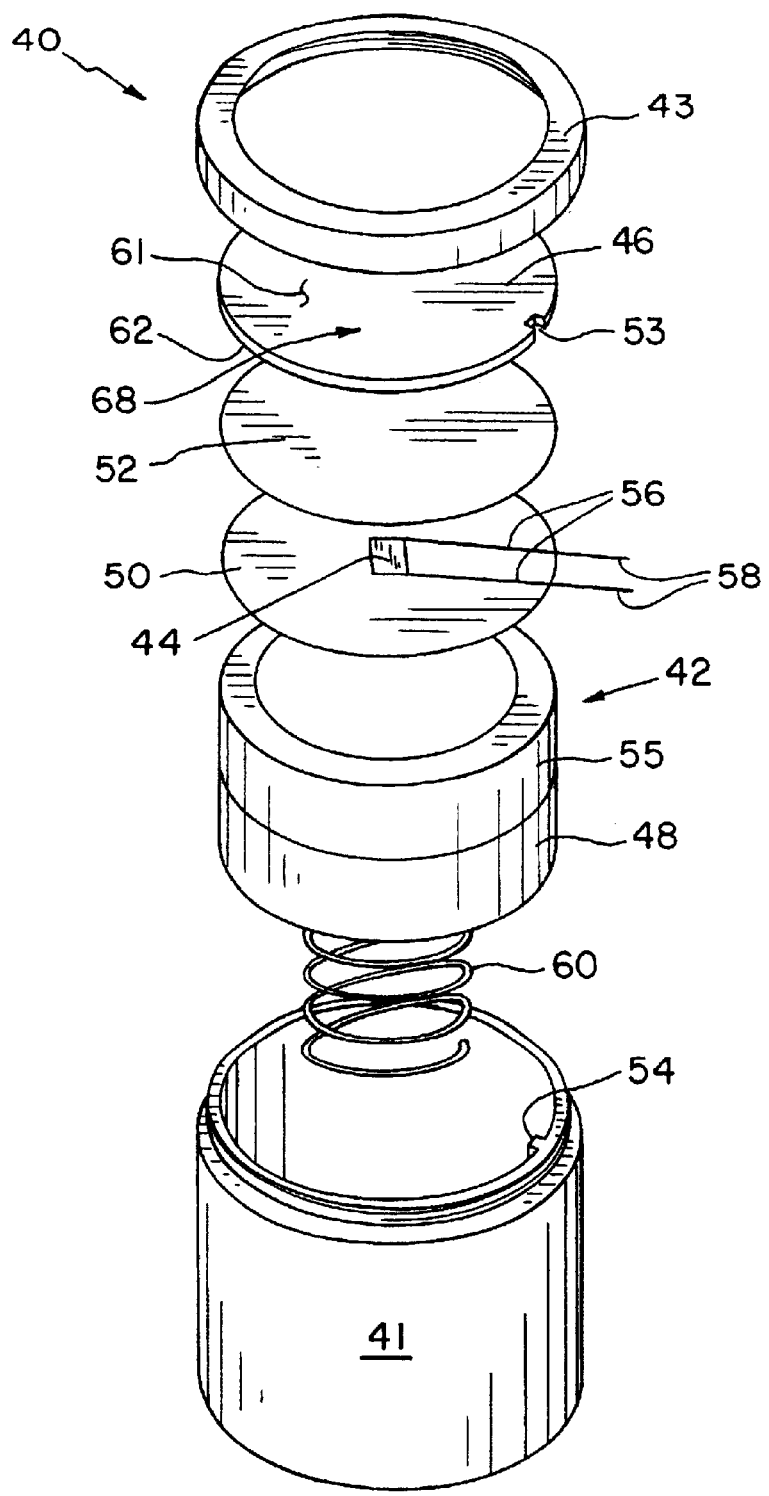
FIG. 3 is an exploded diagrammatic view of the preferred embodiment of the invention.

Referring new to FIGS. 2 and 3, the present invention comprises a shock pressure gauge 40 positioned within target chamber 12 of the apparatus 10. As shown in FIG. 3, the preferred embodiment of a shock pressure gauge 40 comprises a housing 41 with a screw-on ring 43, a pressure gauge medium 44 disposed between a metal disk or 46 and a back-up disk 42, and a momentum trap 48.

In one embodiment of the invention, pressure gauge 40 further comprises a momentum trap 48 for dispersing the shock wave after it is passed through cap 46, pressure gauge medium 44, and back-up disk 42. Momentum trap 48 serves to reduce the momentum of the shock, thereby minimizing reverberation within the gauge and consequently preventing undue damage to back-up disk 42.

In another embodiment of the invention, a guard ring 55 is provided when back-up disk 42 is comprised of a ceramic material. Guard ring 55 circumscribes back-up disk 42 such that back-up disk 42 is in a spaced relationship from housing 41.

Pressure gauge 40 additionally comprises two thin layers of highly electrically resistant material, for providing electrical insulation around the pressure gauge medium 44. As illustrated in FIG. 3, insulation layer 50 insulates between pressure gauge medium 44 and back-up disk 42, and insulation layer 52 prevents electrical conduction between pressure gauge medium 44 and cap 46.

In accordance with the preferred embodiment of the present invention, pressure gauge 40 further comprises a spring 60 disposed between housing 41 and momentum trap 48, for holding momentum trap 48 in intimate contact with back-up disk 42. Additionally, cap 46 is preferably shaped to include an external surface 61 and an internal surface 62, the internal surface 62 being convexly shaped for ensuring intimate contact between pressure gauge medium 44 and the surrounding elements.

Housing 41 is threadably mated with screw-on ring 43, such that all of the enclosed components of the pressure gauge 40 can be accessed. Additionally, housing 41 includes an alignment protrusion 54 for engaging with alignment notch 53 of cap 46. By providing alignment protrusion 54 and alignment notch 53, the invention prevents the rotation of cap 46, thereby preventing undue damage to pressure gauge medium 44. In some configurations, a guard ring 55 circumscribes back-up disk 42 to prevent tensile release waves from entering back-up disk 42 and possibly fracturing back-up disk 42 as it is supporting pressure gauge medium 44.

In the preferred embodiment of the invention, the pressure gauge medium is composed of a form of manganin, but it may also be composed of any piezoresistive material, including 86Cu-12Mn-2Ni, 83Cu-13Mn-4Ni, or ytterbium or piezoelectric materials such as PolyVinyDene Fluoride (PVDF). According to the preferred embodiment of the invention, the piezoresistive or piezoelectric material is approximately ¹⁄₁₀ of a micron to two millimeters thick.

Electrical attachments 56 provide current to and from pressure gauge medium 44, and more substantial leads 58 carry the current beyond the external portion of pressure gauge 40. Electrical attachments 56 are preferably composed of gold or copper, but other electrically conductive elements are suitable.

Insulation layers 50, 52, enveloping pressure gauge medium 44, are preferably each a thin layer of highly electrically resistant material, such as or $Al_2O_3$ or $SiO_2$. For piezoelectric material this would be Teflon or a similar film or coating.

Back-up disk 42 is preferably a cylindrically shaped disk that is manufactured of a solid material selected from the group consisting of $B_4C$, $Al_2O_3$, $Si_3N_4$, SiC, $TiB_2$, Borosilicate, Borofloatá by Schott Glass, and Pyrexá by Corning and hardened steel such as AISI 4340 steel or Vasco 300. Disk 42 is of sufficient thickness to prevent spalling as the pressure pulse travels through the material, and of sufficient strength or hardness to minimize deformation of the surface.

Cap 46 is preferably manufactured of a spring steel, such as AISI 1070, or a high strength steel such as AerMet 100, Vasco 300, or AISI 4340, and is shaped such that it is in intimate contact with pressure gauge medium 44 and back-up disk 42. For piezoelectric material, the cap could consist of a polymeric material such as neoflon PTFE. In the preferred embodiment, the internal surface 62 of cap 46 is slightly convexly shaped, such that the concentric portion 68 of internal surface 62 protrudes slightly, forming a tighter engagement between cap 46 and back-up disk 42 on which pressure gauge medium 44 is located.

The present invention operates as follows. When laser shock processing apparatus 10 emits laser beam 16, shock pressure gauge 40 receives a pulse from laser beam 16. Importantly, gauge 40 is positioned within target chamber 12 in such a way as to place all of pressure gauge medium 44 within the cross sectional area of the path of laser beam 16.

When the pulse of coherent energy impacts cap 46, a shock wave is created in the cap 46. It is this shock wave that is useful in improving the fatigue life of workpiece 20, and therefore it is desirable to determine the strength of the shock wave. After being impacted, cap 46 conducts the shock wave to pressure gauge medium 44, wherein a piezoresistive material or piezoelectric, to be discussed further infra, determines the strength of the shock wave.

During operation, electricity is carried by leads 58 and electrical attachments 56 through pressure gauge medium 44. As a shock wave travels through pressure gauge 40, pressure gauge medium 44 responds to the shock wave by altering or impeding the flow of electricity such that the electrical current undergoes a measurable change. The difference in the flow of electricity is measured by an external logic controller circuit or microchip, which converts the measurements into pressure readings. Under pressure piezoresistive material change resistance, and therefore modify the voltage at constant current, and piezoelectric material emit current flow.

As noted above, the advantage of the present invention is that any component of the pressure gauge 40 may be replaced individually, without disposal of the entire pressure gauge 40. This feature is particularly important in the laser shock processing environment because of the high amplitude of the shock waves.

The invention is utilized without a workpiece, or as a sample workpiece, as detailed below. Utilizing the invention without a workpiece, an operator places pressure gauge 40 in the path of laser beam 16, such that the surface area of pressure gauge medium 44 is within the perimeter of the laser beam 16. Laser beam 16 is activated, and a resulting pressure reading is sent to a logic controller or chip.

Alternately, an operator can utilize the invention as a sample workpiece, subjecting cap 46 to an energy-absorbing coating dispensed by material applicator 24 (FIG. 1), and a transparent overlay dispensed by transparent overlay application 26. Finally, laser beam 16 is activated, and cap 46 is subjected to a high amplitude shock wave much like a workpiece would have been subjected, transferring the shock wave to the pressure gauge medium 46 for pressure determinations.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A pressure gauging system, comprising:
   a pressure transducer for gauging pressure, said pressure transducer being provided with an energy-absorbing overlay configured for converting laser energy into a pressure pulse; and
   a laser shock processor, said laser shock processor operatively delivering laser energy to said pressure transducer.

2. The pressure gauging system as recited in claim 1, wherein said pressure transducer further comprises:
   a first component being provided with said energy-absorbing overlay thereupon, said first component operatively receiving laser energy from said laser shock processor and converting such laser energy into a pressure pulse via said energy-absorbing overlay; and
   a pressure sensor, said pressure sensor being disposed in operative pressure sensing relationship with said first component.

3. The pressure gauging system as recited in claim 2, wherein said pressure sensor is operative to sense shock wave activity developed within and transmitted by said first component in response to laser energy applied thereto.

4. The measurement system as recited in claim 2, further comprises a housing to removably house said first component and said pressure sensor.

5. The measurement system as recited in claim 2, wherein said first component further comprises a disk-shaped member.

6. The pressure gauging system as recited in claim 1, wherein said pressure transducer further comprises:
   a pressure-conducting element having said energy-absorbing overlay thereupon, said pressure-conducting element being suitably disposed via said energy-absorbing overlay to enable operative laser energy communication from said laser shock processor thereto, said pressure-conducting element operatively acting in response to laser energy applied thereto, via said energy-absorbing overlay thereon, to have shock wave activity developed therein and transmitted to said pressure-sensing element; and
   a pressure-sensing element disposed in operative pressure sensing relationship with said pressure-conducting element.

7. The measurement system as recited in claim 6, further comprises:
   a back-up disk coupled to said pressure-sensing element; and
   a momentum trap suitably disposed relative to said back-up disk to operatively attenuate pressure energy associated therewith.

8. The pressure gauging system as recited in claim 6, wherein said pressure-conducting element further comprises a transparent overlay.

9. A pressure gauging system, comprising:
   a laser shock processor;
   a pressure-conductive component having an energy-absorbing overlay thereon, said pressure-conductive component being operative via activation of said energy-absorbing overlay to receive laser energy from said laser shock processor said laser shock processor operatively delivering laser energy to said pressure-conductive component, said energy-absorbing overlay converting the laser energy into a pressure pulse; and
   a pressure sensor, said pressure sensor being disposed in operative pressure sensing relationship with said pressure-conductive component.

10. The measurement system as recited in claim 9, further comprises:
    a housing to removably house said pressure-conductive component and said pressure sensor.

11. The measurement system as recited in claim 9, wherein said pressure-conductive component further comprises at least one of a transparent overlay and a coating overlay.

12. The measurement system as recited in claim 9, wherein said pressure-conductive component includes a disk-shaped element, said measurement system further comprises a back-up disk coupled to said pressure sensor, a momentum trap coupled to said back-up disk, and a housing to removably house said disk-shaped element, said pressure sensor, said back-up disk, and said momentum trap.

13. A pressure gauging apparatus, comprising:
    a laser shock processor; and
    a pressure gauging device for operative use with said laser shock processor;

said pressure gauging device comprising:
  a pressure-conductive component having an energy-absorbing overlay thereupon, said laser shock processor operatively delivering laser energy to said pressure-conductive component, said energy-absorbing overlay converting the laser energy into a pressure pulse, and
  a pressure sensor, said pressure sensor being disposed in operative pressure sensing relationship with said pressure-conductive component.

14. The measurement apparatus as recited in claim 13, wherein said measurement device further comprises:
  a housing to removably house said pressure-conductive component and said pressure sensor.

15. The measurement apparatus as recited in claim 14, wherein said measurement device further comprises:
  a support member disposed in support relationship to said pressure sensor; and
  a component to operatively attenuate pressure energy operatively associated with said support member.

16. The pressure gauging apparatus as recited in claim 13, wherein said pressure-conductive component further comprises a transparent overlay.

17. A pressure gauging system, comprising:
  a laser shock processor; and
  a pressure gauging assembly for operative use with said laser shock processor;
  said pressure gauging assembly comprising:
    a pressure sensor,
    a first component having an energy-absorbing overlay thereupon, said first component being operative to receive laser energy from said laser shock processor and to transmit a pressure-related representation thereof to said pressure sensor, and
    a housing to house said first component and said pressure sensor.

18. An pressure gauging apparatus for use with a laser shock processor, said apparatus comprising:
  a housing having a base;
  a cap member disposed in said housing, said laser shock processor operatively delivering laser energy to said cap member, said cap member having an energy-absorbing overlay thereupon, said energy-absorbing layer being capable of converting laser energy into a pressure pulse;
  a pressure sensor disposed in said housing, said pressure sensor being disposed in operative pressure sensing relationship to said cap member;
  a back-up disk disposed between said pressure sensor and said base; and
  a momentum trap disposed between said back-up disk and said base.

19. The apparatus as recited in claim 18, further comprises:
  a spring disposed in said housing, said spring being disposed in biasing relationship to said momentum trap;
  a first insulating element disposed between said pressure sensor and said cap member; and
  a second insulating element disposed between said pressure sensor and said back-up disk.

20. The apparatus as recited in claim 19, further comprises:
  a lid removably secured to said housing.

21. The apparatus as recited in claim 20, wherein said cap member further comprises an interior surface having a convex portion.

22. The pressure gauging apparatus as recited in claim 17, wherein said cap member further comprises a transparent overlay.

23. A pressure gauging method for use with a laser shock processor, said method comprising the steps of:
  providing a target element, said target element having an energy-absorbing layer thereupon;
  applying laser energy generated by said laser shock processor to said energy-absorbing layer on said target element, said laser interacting with said energy-absorbing overlay to generate pressure energy activity; and
  detecting the pressure energy activity developed within said target element in response to the applied laser energy.

24. The pressure gauging method as recited in claim 23, wherein:
  the step of providing said target element further includes the step of providing a pressure-transmitting element operatively arranged to receive the pressure energy activity initiated by the laser energy; and
  the detection step further includes the step of providing a pressure-sensing element operatively arranged to sense pressure energy transmitted by said pressure-transmitting element.

25. The pressure gauging method as recited in claim 24, further comprises the step of:
  providing said pressure-transmitting element with a transparent overlay.

26. A pressure gauging method for use with a laser shock processor, said method comprising the steps of:
  activating said laser shock processor to generate a laser emission;
  transforming the laser emission into a representative pressure energy signal through use of an energy-absorbing material; and
  detecting the pressure energy signal.

27. The method as recited in claim 26, wherein the transformation step further comprises the steps of:
  applying the laser emission to a pressure-conducting element, wherein application of the laser emission causes pressure energy activity to develop within said pressure-conducting element.

28. The method as recited in claim 27, wherein the detection step further comprises the steps of:
  providing a pressure-sensing element to sense pressure energy activity operatively communicated by said pressure-conducting element.

29. The pressure gauging method as recited in claim 28, wherein the energy-absorbing material is a coating overlay, the pressure gauging method further comprising the step of:
  providing said pressure-transmitting element with a transparent overlay.

* * * * *